United States Patent [19]

Michel

[11] Patent Number: 4,638,705
[45] Date of Patent: Jan. 27, 1987

[54] MACHINE FOR TRIMMING AND DISBUDDING VINE SHOOTS

[76] Inventor: Chazalon Michel, La Bastide, Vogue-07200 Aubenas, France

[21] Appl. No.: 831,537

[22] Filed: Feb. 21, 1986

[30] Foreign Application Priority Data

Feb. 26, 1985 [FR] France ................................ 85 03005

[51] Int. Cl.⁴ .............................................. A01G 17/00
[52] U.S. Cl. ....................................... 83/701; 144/2 Z; 144/208 F
[58] Field of Search ............. 83/701; 144/2 Z, 208 E; 130/30 R

[56] References Cited

U.S. PATENT DOCUMENTS

| | | | |
|---|---|---|---|
| 3,026,919 | 3/1962 | Lunn | 144/208 E |
| 3,552,456 | 1/1971 | Johansson | 144/208 E |
| 3,724,518 | 4/1973 | Zehavi et al. | 144/208 E |
| 4,050,485 | 9/1977 | Valo | 144/208 E X |
| 4,298,042 | 11/1981 | Petola | 144/208 E X |

*Primary Examiner*—Donald R. Schran
*Attorney, Agent, or Firm*—Bacon & Thomas

[57] ABSTRACT

A machine for trimming vine shoots for subsequent use as graft supports including a vertical frame defining a cylindrical bearing surface supporting a trimming and disbudding rotary head, the latter including a plurality of combined tools carried by an annular platen.

10 Claims, 9 Drawing Figures

MACHINE FOR TRIMMING AND DISBUDDING VINE SHOOTS

The present invention relates to a machine used for trimming vine shoots taken from mother vines and destined to be cut into segments of predetermined length, for subsequent use as graft-supports.

The trimming of these shoots consists in removing any tendrils, young lateral shoots, buds or eyes in order to facilitate the subsequent operations of storage, cutting to length and grafting.

The object of such machines has been to mechanize the aforesaid operations which until then, had been performed manually.

For example, French Patent No. 456 737 proposes to mount a cutting device on a horizontal frame, said device comprising substantially tubular inlet guide means, about which a cutter can be moved in rotation, in parallel to the axis of the guide means, said cutter also extending in parallel to said axis.

The cutting device according to the aforesaid patent, precedes a forward drive assembly constituted by a pair of superposed rollers.

Undeniably, this first proposition has solved to a certain extent, the problem raised by the trimming of vine shoots by hand. Yet, the proposed solution appears too cumbersome and inadequate to give a service in proportion with the work to be done. Indeed, in every case, the cutter turns outside the tubular guide of the cutting device. In order to allow cutting or severing, said tubular guide is provided with axial slots for the engagement of the tendrils or young shoots. The tubular guide, having to allow for possible differences in shoots cross-section, is given a relatively large diameter. Thus, every shoot engaged in the guide has a possibility of relative movement therein, and the cutter, when cutting, can leave out stubs of tendrils or young shoots.

Moreover, the aforesaid teaching makes no provision for holding the forepart of the shoot, so that any fluctuations caused by vibrations, or offcentered presentations, because of the bending of the shoots, give, in the end, a rather unsatisfactory result.

In addition, the advancing speed or forward driving speed of each shoot must allow for the speed of rotation of the cutter, in order to ensure that the whole peripheral surface of the shoot has been covered. This of course reduces the hourly capacity of the machine.

Another French Patent, No. 82-20 024 (2536693), proposes to use two pairs of circular saws, the saws of each pair being arranged in parallel, and in such a way that the two pairs, being offset with respect to the direction in which the shoot moves, define two orthogonal cutting planes.

According to this technique, a shoot is picked up by a pair of parallel saws which cutt off any tendrils or young shoots going through their plane. The shoot is then picked up in the same way by the second pair of saws in order to be thereafter driven forward by a set of press-rollers.

Such a technical solution is not really satisfactory, since it necessitates to shift the cutting plane of each circular saw with respect to the face in contact with the shoot. The drawback here, is that the shoot is damaged, and moreover, the tendrils or young shoots are not cut flush with the shoot. The remaining stubs are responsible in the end for giving grafts-supports of poor quality.

In addition to the aforesaid drawback, it must be noted that, in said patent application, there is no technical disposition provided to guide the manual introduction of the shoots, of which the natural bending, if only in certain parts, does not permit a really satisfactory trimming work.

Therefore the prior art does not really offer any satisfactory solution for trimming vine shoots, whatever their length, diameter or shape.

It is the object of the present invention to solve the existing problems by proposing a new trimming and disbudding machine of relatively small overall dimensions able to be readily installed for temporary use on any kind of support surface and to give good quality service at a good output rate.

Another object of the invention is to propose a new machine with guaranteed safety for the operator, and permitting a particularly precise and regular trimming work, without bruising or damaging the skin of the treated shoots.

Yet another object of the invention is to propose a new machine which is particularly designed to guarantee a constant quality of trimming, whatever the diameter or shape of the vine shoots.

These objects are reached according to the invention with a machine comprising a vertical frame defining a cylindrical bearing surface of horizontal axis, supporting a trimming and disbudding rotary head, composed of:

a main annular plate,
a tool-holding annular platen, mounted loosely radially with elastic centering on the plate with which it defines the inlet hatch,
n combined tools, at equal angular distance one from the other, mounted on said platen each tool being formed by:
  a radial slide-block carrying a cutter and a rotating roller of which the rotation plane forms an angle different from 90° with the axis of the hatch, said slide-block being urged into a centripetal movement by an elastic member,
  a lever with two branches carried by the platen, and of which one branch is engaged under a yoke of the slide-block,
a ring against which rest the large branches of the levers, and which is carried by a fork hinged on to the frame, and
means for controlling, via said fork, the axial movement of the ring in the same direction as that into which the slide-blocks are urged by the levers moving centrifugally against the action of their elastic return members.

The invention will be more readily understood on reading the following description with reference to the accompanying drawings, in which.

Figure 1:
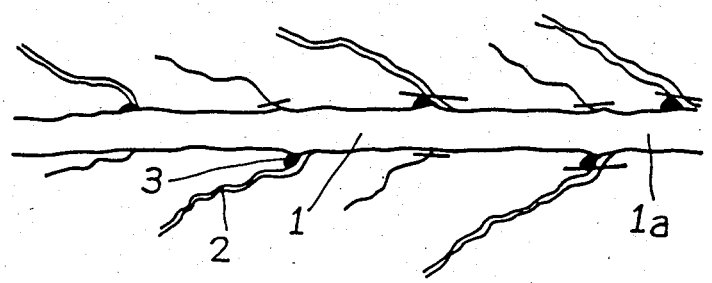
FIG. 1 is a diagrammatical view illustrating a vine shoot before the trimming treatment.

Referring first of all to FIG. 1, this shows a vine shoot 1 of which the ends have been cut off and which presents, here and there, lengthwise, lateral tendrils or young shoots 2, as well as buds or eyes 3.

This shoot has to be trimmed for removing the tendrils or young shoots 2, and the eyes 3, if any, before it can be used as a graft-support for vegetative multiplication. This technique is not directly related to the present invention as it is more concerned with grafting and planting operations to take place later on.

For trimming the tendrils or young shoots 2 and the eyes or buds 3, the machine according to the invention comprises, as illustrated in FIGS. 1 to 5, a frame 4 constituted by a very thick plate standing on a base 5. Said frame 4 defines in its central part, a cylindrical bearing surface 6 of horizontal axis supporting, via a bearing 7, a rotating trimming and disbudding head 8. Said head 8 comprises a tubular-type substantially cylindrical rotor 9, which is centered by bearing 7. The rotor 9 projects beyond the rear face 4a of the frame and forms a gear ring 10 operationally coupled by way of a belt 11 with the output gear 12 of an electric drive motor 13 fixed on said frame.

The rotor 9 supports, on its face opposite the gear ring 10, a main annular plate 14 which is preferably removable and is secured in position by means of axial screws. The main annular plate 14 supports an intermediate plate 15, likewise annular-shaped, which is so mounted as to be slidable diametrically with respect to said main annular plate 14. To this end, the intermediate plate 15 may be equipped with keys or studs 16 which cooperate with radial slides provided in the corresponding face of the main annular plate 14.

Figure 6:
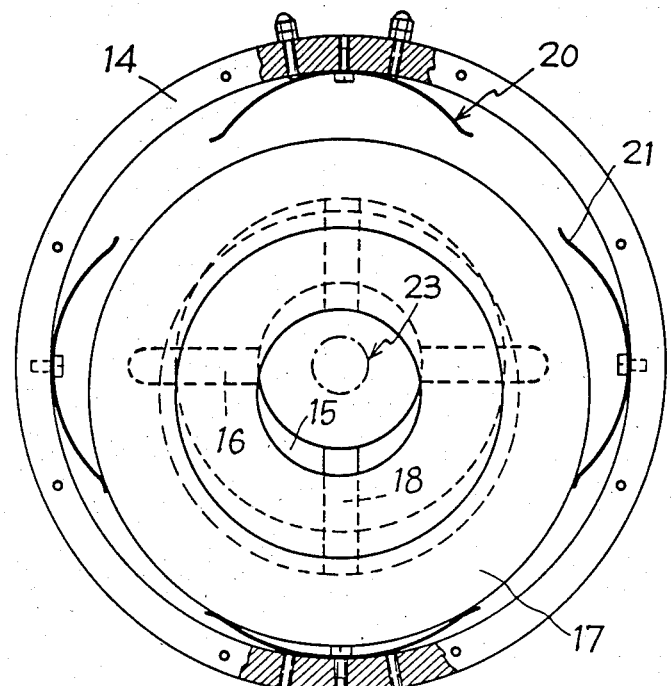
FIGS. 6 and 7 are partial views taken along lines VI—VI and VII—VII of FIG. 3.
Figure 7:
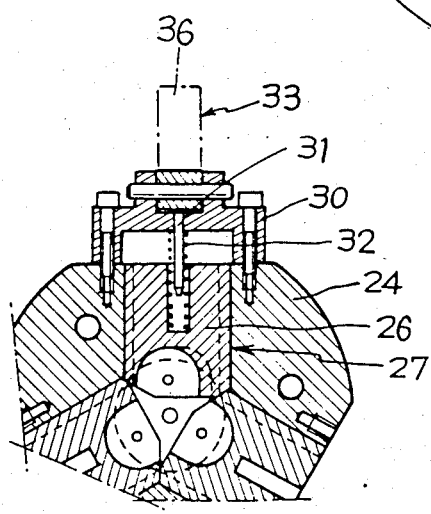
Figure 2:
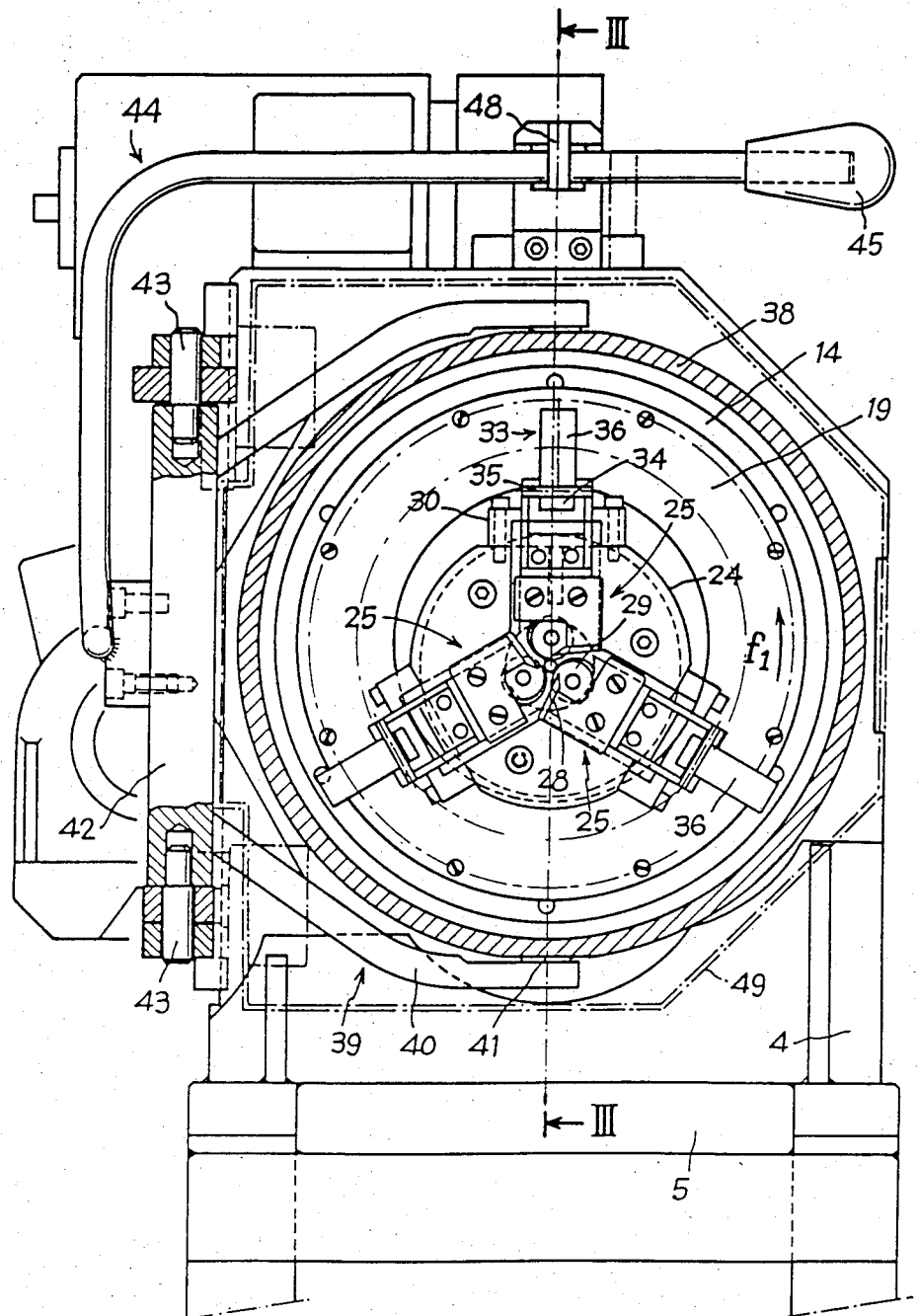
FIG. 2 is a front view, partly in cross-section, of the machine according to the invention.

The intermediate annular plate 15 supports a secondary annular plate 17, which is also mounted for sliding in a diametrical direction, said direction being however orthogonal to the direction in which the intermediate annular plate 15 can slide with respect to the main plate 14. This diametrical displacement is also made possible, for example by the use of keys or studs 18, which are engaged in corresponding slides provided in the annular intermediate plate 15. The secondary annular plate 17 is secured in position against any accidental axial displacement, by an elastically pre-stressed friction ring 19, placed on the periphery of the main annular plate 14. FIG. 6 shows that the secondary annular plate 17 is also coupled to the peripheral edge of the main annular plate 14 by way of elastic centering means 20 comprising, for example, four leaf-springs 21 fixed on the inner periphery of the edge of the secondary annular plate 14 and arching towards the periphery of the secondary annular plate 17 via adjusting screws 22.

As shown in FIG. 6, the secondary annular plate 17, when in the rest position, occupies more particulary, a lower position due to the gravity stresses which it causes to one or two of the leaf-springs 21.

On the contrary, it is obvious that immediately the rotor 9 is driven in rotation, the secondary plate 17 is automatically centered by being stabilized in position by the ends of the branches of the leaf-springs 21.

The plates 14, 15 and 17 define together, by their central opening, an inlet hatch 23, of axis x—x', permitting the introduction of a shoot such as 1, to be trimmed.

The secondary annular plate 17 supports an annular platen 24 with which it forms an orbital trimming and disbudding head. The platen 24 supports, as illustrated in FIGS. 2, 3, 5 and 7, a plurality of combined tools 25 extending radially at equal angular distance one from the other. The tools 25 are preferably three in number, each one comprising a slide-block 26 guided inside a radial slide way 27 provided in the platen 24. Each slide-block 26 supports, on its outer face, a cutter 28 of adjustable radial position and, at its inner end, a freely rotating roller 29, the rotating plane of which forms an angle different from 90° with the axis x—x'. All of said rollers 29 are inclined in the same direction, so as to work as explained hereinafter.

Each combined tool 25 also comprises a connector bar 30 fixed on the platen 24, in such a way as to project in extension of the outer end of slide-block 26. Said connector bar 30 supports a guiding pin 31 adapted to penetrate inside a bore of the slide-block. Said pin 31 is operationally coupled to a helical spring 32 working under compression, interposed between said spring and the connector bar 30 in order to permanently urge the slide-block in centripetal radial displacement. The connector bar 30 supports a pivoting lever 33 with two branches. The small branch 34 of the lever 33 is permanently engaged in a yoke member 35 borne by the outer face of the slide-block 26. The large branch 36 of the lever 33 is urged in permanent resting contact on the flanged part 37 of a ring 38 by the action of elastic member 32, said ring 38 being held in position by a fork 39 so as to extend in parallel to the different plates and co-axially to axis x—x'. The fork 39 comprises two prongs 40 which support the ring 38 via two lugs 41. Said prongs 40 are fast with a bar 42 which is secured via pivots 43 on the frame 4. The fork 39 is operationally coupled to means 44 for controlling the displacement of the ring 38 in the direction in which the levers 33 are pivotally urged in order to control the radial centrifugal displacement of the slide-blocks 26. Said means 44 comprise a hand-operated control lever 45 and a pneumatic-type jack 46, the piston rod 47 of which is hooked on to the lever 45 via movable fastening hook 48.

The frame 4 supports a protection hood 49 which covers the ring 38 and the different plates of the orbital trimming and disbudding head. Said hood 49 comprises in its center a funnel 50 centered on axis x—x'.

The frame 4 supports, at its end opposite the trimming and disbudding head, an assembly 51 for driving a vine shoot through the hatch 23. Said assembly 51 is constituted by two pairs 52 and 53 of rollers, the rollers of each pair being superposed and arranged in such a way that their tangential points are in alignment on axis x—'. The rollers of pairs 52 and 53 are borne by pairs of levers 54 and 55 hinged on to the frame and urged by elastic return members 56 and 57, so that the rollers of each pair are urged closer together. The rollers of pairs 52 and 53 are driven in rotation, via synchronous belts 58 and 59 passing over two pinions 60 and 61 which are driven in rotation by a belt 62 passing partly over the output gear 63 of an electric motor 64 carried by the frame 4.

The pairs of rollers 52 and 53 are also associated to a guide 65 designed substantially as a truncated envelope, open at its two bases, and supported via the frame 4 so as to be co-axial to axis x—x'.

Figure 3:
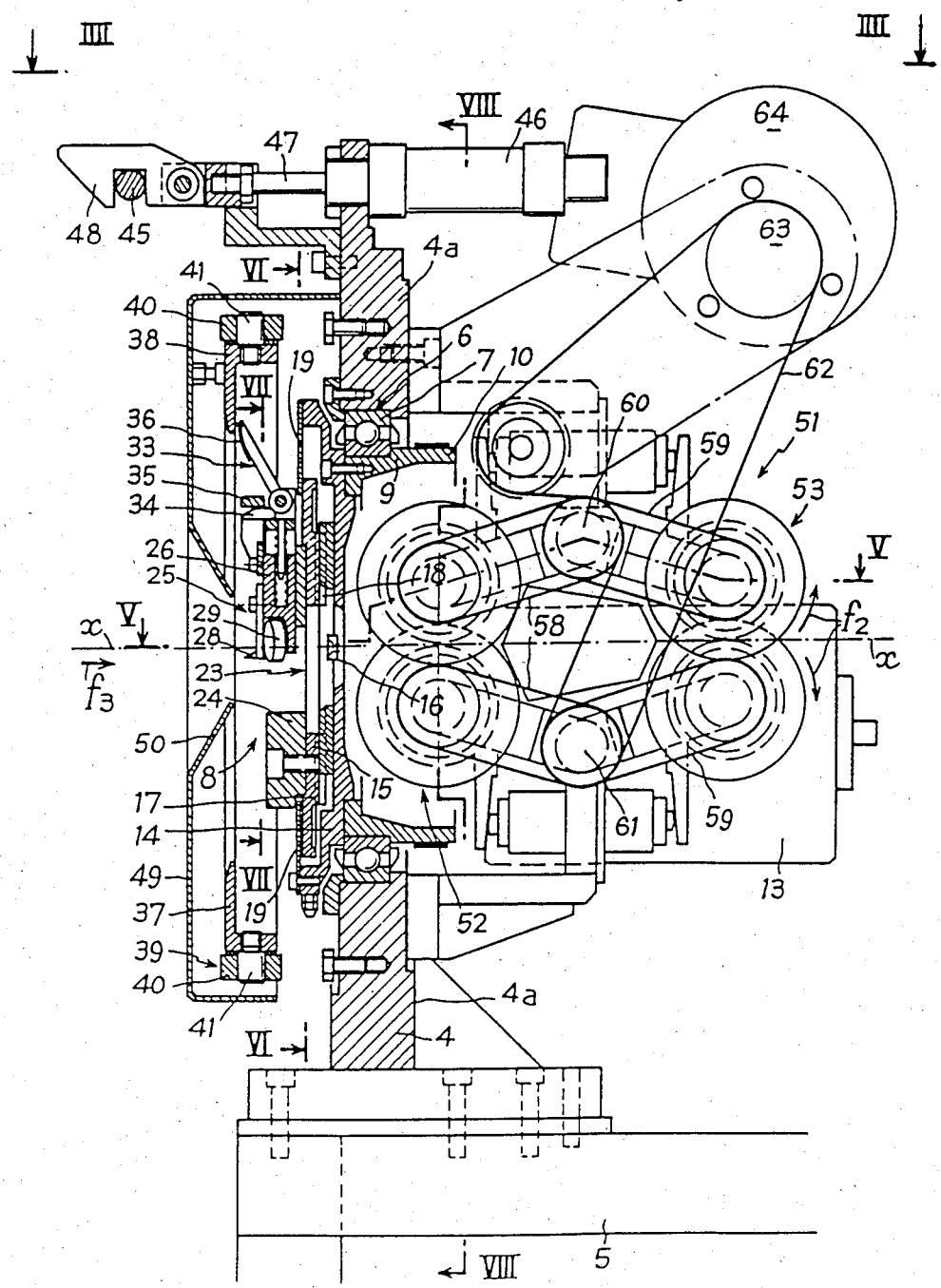
FIG. 3 is a cross-section taken along line III—III of FIG. 2.
Figure 4:
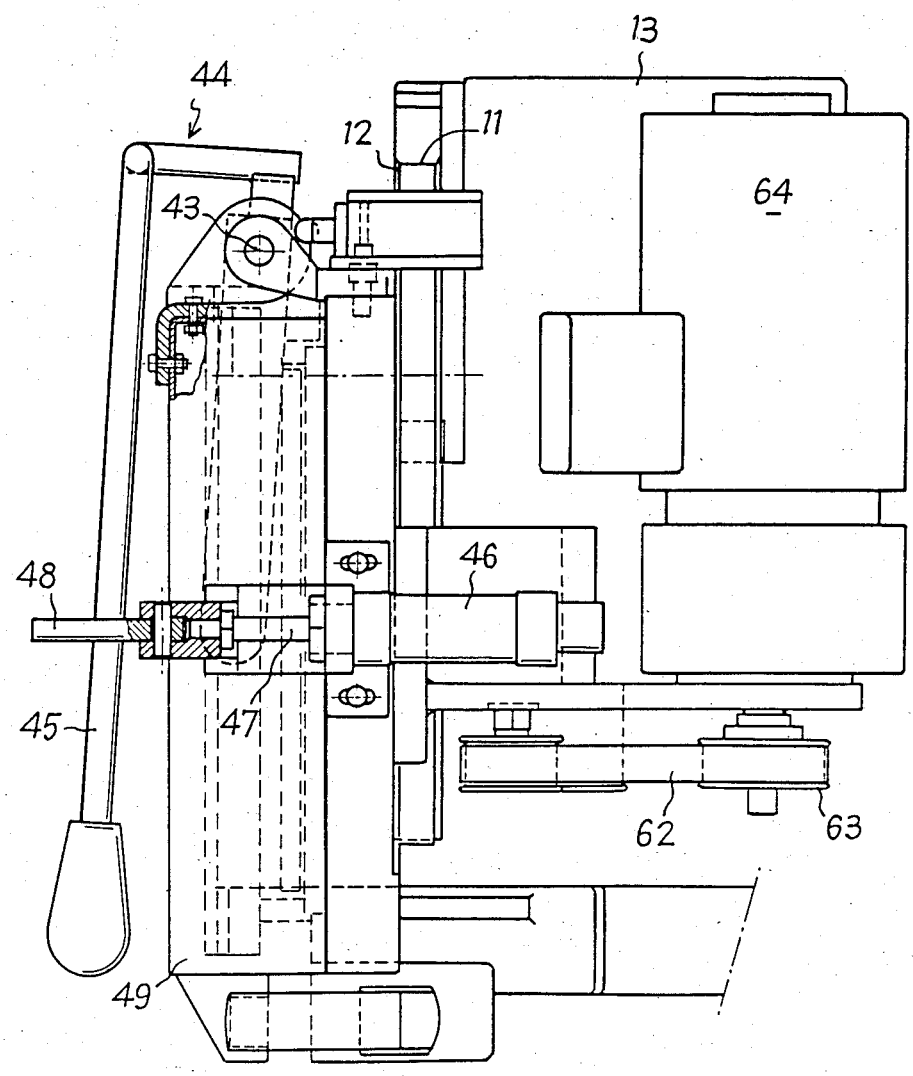
FIG. 4 is a plan view taken substantially along line IV—IV of FIG. 3.
Figure 5:
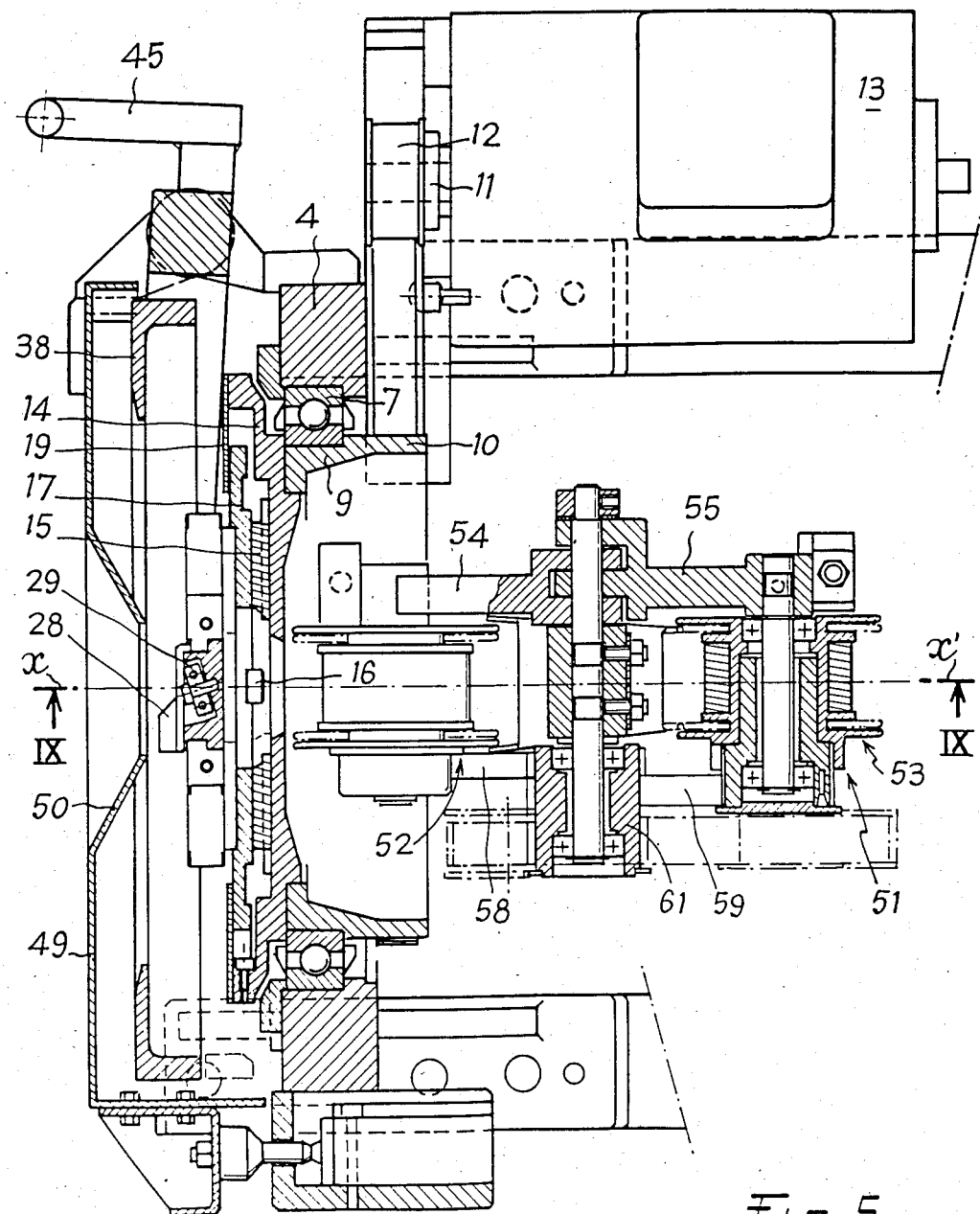
FIG. 5 is a cross-section taken along line V—V of FIG. 3.
Figure 8:
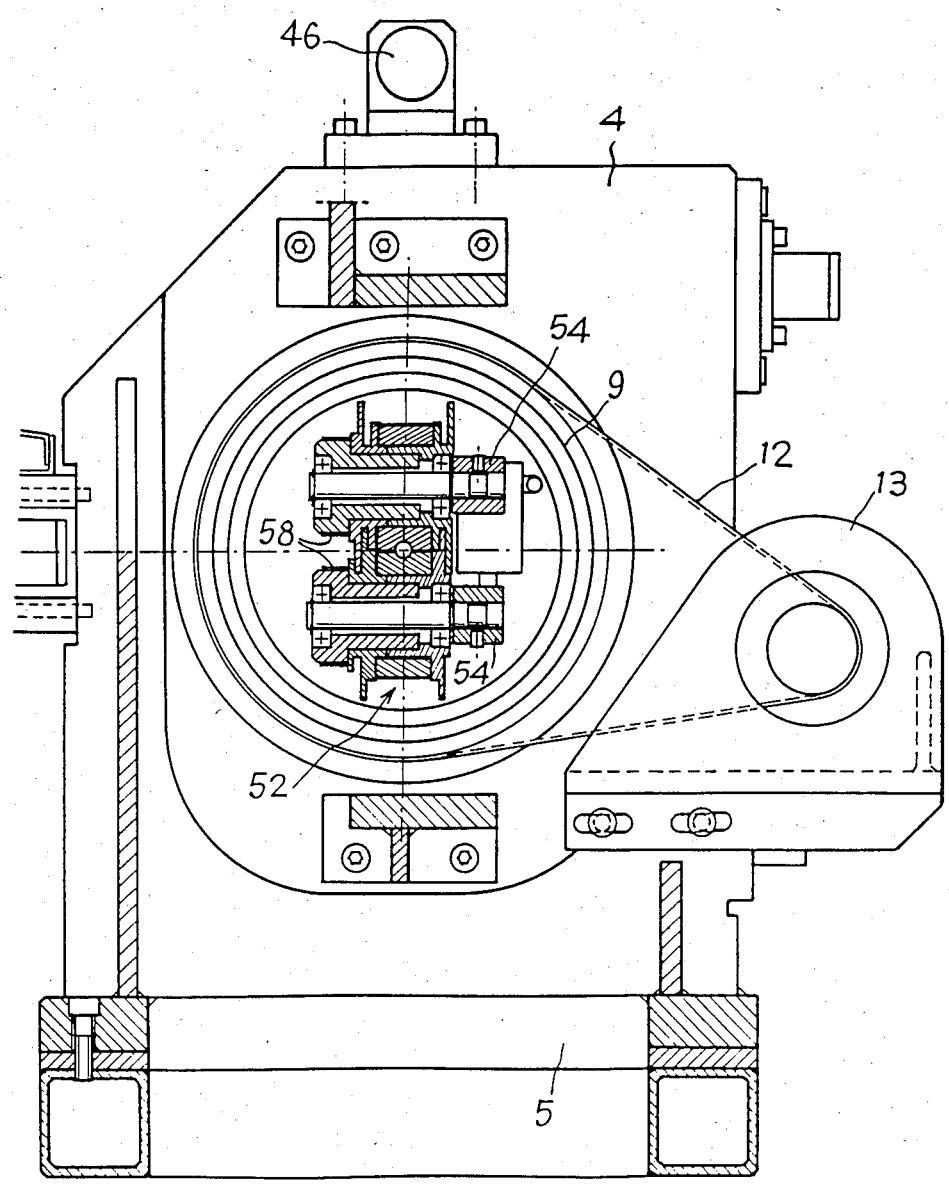
FIGS. 8 and 9 are cross-sections taken along lines VIII—VIII and IX—IX of FIG. 3.
Figure 9:
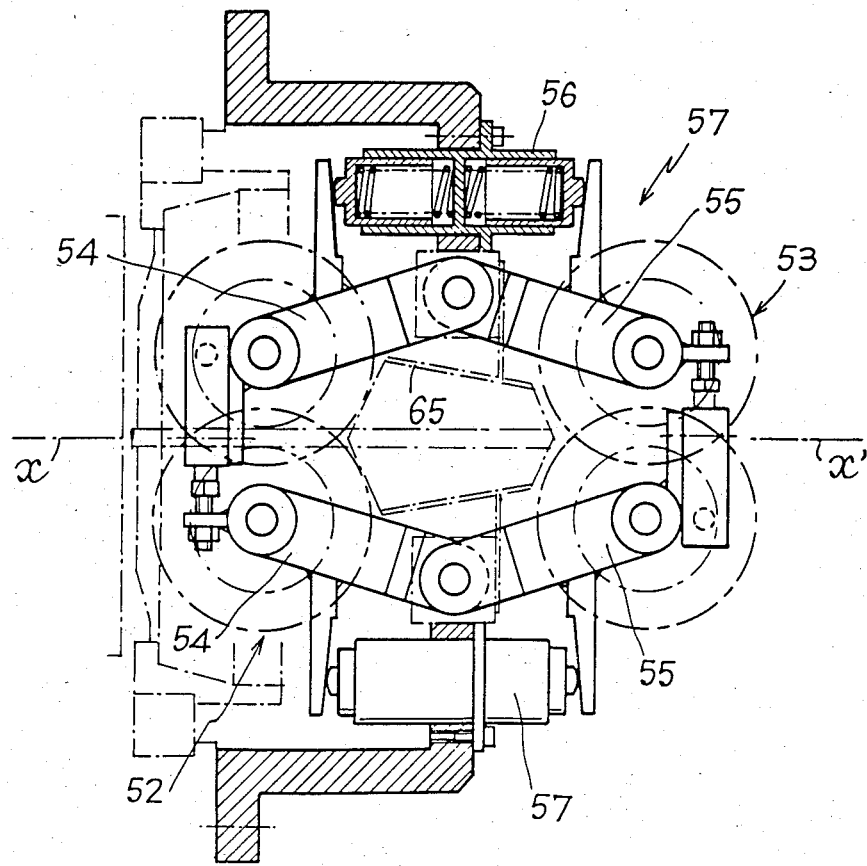

The machine describes hereinabove works as follows:

According to FIG. 3, the jack 46 is supplied to the extent that the piston rod 47 is in maximum extension. The ring 48 is thus placed at a maximum distance apart from the frame 4 and, as a result, the levers 33 and elastic members 32 bring the slide-blocks 26 in a radially retracted position in which the rollers 29 behave as a diaphragm limiting to the smallest surface possible, the aperture of inlet hatch 23.

When the trimming and disbudding head is set in rotation in the direction of arrow $f_1$ by the motor 13, the rotor 9 turns inside bearing 7, driving the different plates in rotation. The effect of this rotation is the centering of platen 24 by radial displacement of the secondary annular plate 17. The aperture, defined by rollers 29, is thus centered on axis x—x' via elastic members 20.

The working of the machine also implies energizing the electric motor 64 whose function is to drive the pairs of rollers 52 and 53 in the direction of arrows $f_2$.

The machine is then ready to be used for trimming a vine shoot 1 such as illustrated in FIG. 1. The shoot is presented in the funnel part 50, its bigger end 1a first, so that the tendrils or young shoots are inclined in such a direction that they will not impede the engagement or introduction of the shoot 1 in the direction of arrow $f_3$.

The operator presents the end 1a and, either actuates the lever 45 by hand, or supplies the jack 46 in order to control the axial displacement of the ring 38 closer to the frame 4. Said ring 38 thus controls the pivoting movement of the levers 33, of which the small branches 34 urge the slide-blocks 26 in centrifugal displacement with respect to the platen 24.

The effect of this is to enlarge the aperture of the diaphragm defined by the rollers so as to allow the introduction of the end 1a of the shoot 1.

When this introduction is completed, the shoot having been presented substantially in parallel to axis x—x', the operator releases his action on the hand lever 45 or on the jack 46. The elastic members 32 urge the slide-blocks once more in a centripetal radial displacement with the object of bringing the roller 29 back in contact with the periphery of the shoot 1.

Considering the relative inclination of the rotation plane of the rollers 23, the rotation of platen 24 in the direction of arrow $f_1$ results in a helicoidal winding which causes the displacement of the shoot in the direction of arrow $f_3$.

During this displacement, the cutters 28 are brought in such a position as to either surround completely or advance before the whole periphery of the shoot, and consequently, severe off any tendrils, young shoots, buds or eyes which they come against. Said cutters perform a regular and accurate cutting which is dependent on their prior adjustment in relation to a contact point determined by the periphery of the corresponding roller 29. Such adjustment may be effected so that the cutting is level with or as close as possible to the skin of the shoot.

Thus, during the peripheral trimming of the shoot, said shoot is kept centered on axis x—x' via rollers 29 which also force it to move forward in the direction of arrow $f_3$, through the hatch 23. Beyond said hatch 23, the shoot 1 is picked up by the first pair 52 of rollers of the drive assembly 51. The shoot is immobilized in two points situated on axis x—x' and is driven forward in a linear way, so that shearing, cutting or severing of the tendrils, young shoots, buds or eyes can be performed with accuracy as and when these present themselves.

It should be noted that any bent part of the shoot 1 will not disturb the operation of the orbital trimming and disbudding head. Indeed, supposing that a considerable inflexion is present on the part of shoot 1 being introduced into the aperture defined by the rollers, the radial offset which follows is compensated by the orbital displacement of the platen 24 authorized by annular secondary plate 17.

The working tools therefore keep a peripheral contact with the arched part of the shoot and perform the same accurate trimming and disbudding work, since the head which carries them is able to follow a planetary trajectory corresponding to the temporary offsetting created by the inflexion of the shoot portion going through the hatch 23.

It should also be noted that any local bosses or deformations will not affect the operation of the head. In such a case, the roller under which such a boss arrives is pushed back elastically in centrifugal displacement against the action of elastic return member 32.

The shoot 1, engaged as described hereinabove and picked up by the first pair 52 of rollers, is automatically engaged through the guide 65 and presents itself in axial alignment to be picked up by the second pair 53 of press-rollers.

Therefore due to the means according to the invention, the operator of the machine can release his attention to the work, and no particular skill is required of him because once the diaphragm is opened enough to allow the introduction of the end part of every shoot, the shoot is picked up in the plane of the working head. Beyond that head, the shoot is picked up by the pairs of rollers 52 and 53, and is then kept in an axial direction substantially close to axis x—x'. The shoot is held in three different parts, this giving it, locally, a substantially linear structure which eliminates axial offsets, deformations and other local bendings which in a lot of cases, are responsible for unsatisfactory trimming.

With the machine according to the invention, the operator is only required to held the end part of the shoot during its introduction and to ensure its alignment with axis x—x' when it is introduced in the funnel part 20, 30, 50.

It should be noted that the orbital movability of the working head and the elastic retractability of the rollers 29 eliminate stresses, bruising or damages which normally may be inflicted to the skin of the shoots.

It is thus eventually possible to obtain sounder graft-supports.

The same result is obtained when the pairs 52 and 53 of rollers are mounted on the end of elastically returnable levers 58 and 59, this authorizing a relative spacing out of the rollers in relation to the local cross-section of the presented shoot.

Another advantage of the present invention resides in the fact that the protection hood 49 has, because of its funnel form 50, a guiding function at the introduction time, as well as a function of collecting the tendrils and young shoots which are removed by gravity sliding out of the big open base of said funnel 50.

The invention is in no way limited to the description given hereinabove and on the contrary covers any modifications that can be brought thereto without departing from its scope.

What is claimed is:

1. Machine for trimming and disbudding vine shoots destined to be used subsequently as graft-supports, of the type comprising, a cutting device with an inlet hatch for a vine shoot, and at least one cutter rotating about the horizontal axis of said inlet hatch mounted on a supporting frame and a forward drive assembly for the shoot; formed at by at least two press-rollers resiliently disposed in superposed manner, one at least of which is driven in rotation by a drive member, said machine having a vertical frame, said frame defining a cylindrical bearing surface of horizontal axis, supporting a rotating trimming and disbudding head comprising:
- a main annular plate,
- a tool-holding annular platen, mounted loosely radially with elastic centering on the plate with which it defines the inlet hatch,
- a plurality of combined tools, at equal annular distance one from the other, mounted on said platen each tool being formed by:
  - a radial slide-block carrying a cutter and a rotating roller of which the rotation plane forms an angle different from 90° with the axis of the hatch, said slide-block being urged into a centripetal movement by an elastic member,
  - a lever, including a small branch and a large branch, carried by the platen, and of which the small branch is engaged under a yoke of the slide-block,
- a ring, the large branch of each lever resting against the ring, and which ring is carried by a fork hinged on to the frame, and
- means for controlling, via said fork, the axial movement of the ring in the same direction as that into which the slide-blocks are urged by the levers moving centrifugally against the action of their elastic return members.

2. Machine as claimed in claim 1, wherein the elastically-centered loose-mounted platen is secured to an annular secondary plate mounted for sliding in a diametrical direction with respect to an intermediate annular plate mounted for sliding on the main annular plate in a diametrical direction orthogonal to the sliding direction of the secondary plate, elastic centering means being interposed between the main plate and the secondary plate.

3. Machine as claimed in claim 2, wherein the secondary plate is subjected to the action of a friction ring provided on the periphery of the main annular plate.

4. Machine as claimed in claim 1, wherein said main annular plate is secured to a tubular cylindrical rotor of horizontal axis, mounted for rotating, via a bearing, inside a bearing surface of the frame and forming, opposite said plate, a gear ring driven in rotation by a motor fixed on the frame.

5. Machine as claimed in claim 1, wherein each combined tool comprises: a slide-block guided inside a radial slide way provided in the platen, a connector-bar fixed on the platen in facing relation to the outer end of the slide-block, guiding means interposed between said slide-block and said connector bar, a yoke member fixed on the outer face of said slide-block, and a lever with two branches mounted for pivoting on said connector bar, one of said branches being engaged under the yoke member, and the other extending obliquely in the direction opposite to the frame in order to cooperate with the ring.

6. Machine as claimed in claim 1, wherein the trimming and disbudding head is covered over with a protection hood defining a central funnel for introduction, co-axial to the hatch, and rejection towards the outside, of the tendrils and young shoots.

7. Machine as claimed in claim 1, wherein the means used for controlling the axial displacement of the ring comprise a hand lever integral with the fork and a jack mounted on the frame and of which the piston rod is operationally coupled to the hand lever by way of a movable fastening hook.

8. Machine as claimed in claim 1, wherein said machine further comprises a forward drive assembly mounted on the frame and constituted by two pairs of superposed rollers supported by pivoting levers operationally coupled to elastic members urging the rollers of each pair close together, all of said rollers being driven in rotation by a motor fixed on the frame.

9. Machine as claimed in claim 8, wherein the pairs of rollers are placed on the other side of the frame with respect to the head and define together a guide way which follows the axis of the inlet hatch.

10. Machine as claimed in claim 8, wherein the pairs of rollers are operationally coupled to a progressing guide placed between them.

* * * * *